United States Patent [19]

Kurematsu et al.

[11] Patent Number: 5,191,472
[45] Date of Patent: Mar. 2, 1993

[54] APPARATUS HAVING A SCREEN WITH LIGHT BLOCKING ELEMENTS

[75] Inventors: Katsumi Kurematsu, Kawasaki; Nobuo Minoura, Yokohama; Haruyuki Yanagi, Yokohama; Hideaki Mitsutake, Yokohama, all of Japan

[73] Assignee: Canon Kabushiki Kaisha, Japan

[21] Appl. No.: 442,723

[22] Filed: Nov. 29, 1989

[30] Foreign Application Priority Data

Nov. 29, 1988 [JP] Japan .................. 63-301357
Nov. 24, 1989 [JP] Japan .................. 1-305057

[51] Int. Cl.$^5$ .................. G02B 27/00; G02B 3/08; G03B 21/60
[52] U.S. Cl. .................. 359/619; 359/449; 359/457; 359/742; 353/78
[58] Field of Search .............. 350/452, 168, 322, 117, 350/122, 123, 124, 125, 127, 128, 167; 353/74, 75, 76, 77, 78, 79, 38; 359/443, 448, 449, 450, 451, 454, 455, 615, 893, 741, 742, 621, 619, 456, 457

[56] References Cited

U.S. PATENT DOCUMENTS

| | | | |
|---|---|---|---|
| 2,441,747 | 5/1948 | Beshgetoor | 76/107 |
| 2,510,344 | 3/1945 | Law | 350/128 |
| 3,523,717 | 8/1970 | Glenn | 359/449 |
| 3,848,980 | 11/1974 | Plummer | 350/128 X |
| 3,972,593 | 8/1976 | Appledorn | 350/211 |
| 3,982,822 | 9/1976 | Conder et al. | 350/211 |
| 4,076,384 | 2/1978 | Deml et al. | 350/452 X |
| 4,147,408 | 4/1979 | Plummer | 350/128 |
| 4,152,047 | 5/1979 | Inoue | 350/122 |
| 4,173,399 | 11/1979 | Yevick | 353/78 |
| 4,374,609 | 2/1983 | Lange | 350/128 |
| 4,391,495 | 7/1983 | Mazurkewitz | 350/452 |
| 4,439,027 | 3/1984 | Shioda et al. | 353/77 |
| 4,458,993 | 7/1984 | Kempf | 353/82 |
| 4,468,092 | 8/1984 | Inoue et al. | 350/128 |
| 4,482,206 | 11/1984 | VanBreemen | 350/128 |
| 4,509,822 | 4/1985 | Clausen | 350/128 |
| 4,512,631 | 3/1985 | VanBreemen | 350/128 |
| 4,525,029 | 6/1985 | Inoue et al. | 350/128 |
| 4,550,977 | 11/1985 | Inoue et al. | 350/128 |
| 4,666,248 | 5/1987 | van de Ven | 350/128 |
| 4,674,836 | 6/1987 | Yata et al. | 350/128 |
| 4,701,020 | 10/1987 | Bradley, Jr. | 350/128 |
| 4,708,435 | 11/1987 | Yata et al. | 350/129 |
| 4,721,361 | 1/1988 | van de Ven | 350/128 |
| 4,725,134 | 2/1988 | Ogino | 350/128 X |
| 4,919,518 | 4/1990 | Ogino et al. | 350/128 |

FOREIGN PATENT DOCUMENTS

| | | |
|---|---|---|
| 1487841 | 5/1967 | France . |
| 0061738 | 9/1985 | Japan .................. 350/117 |
| 692569 | 6/1953 | United Kingdom . |

Primary Examiner—Bruce Y. Arnold
Assistant Examiner—David R. Parsons
Attorney, Agent, or Firm—Fitzpatrick, Cella, Harper & Scinto

[57] ABSTRACT

An image display apparatus comprises an image projection system having a projecting optical system, and a screen for displaying an image by receiving the image light deflected by a mirror system. The screen has a plurality of sheets one of which contains a group of cylindrical lenses which act as light transmitting areas and light blocking areas arranged on an image light exit plane along the direction of arrangement of the cylindrical lenses. The screen arrangement is capable of blocking undesirable reflected light.

8 Claims, 2 Drawing Sheets

APPARATUS HAVING A SCREEN WITH LIGHT BLOCKING ELEMENTS

BACKGROUND OF THE INVENTION

The present invention relates to a back projection type image display apparatus which obliquely projects an image light of a display device such as a CRT or LC to a screen from a back plane, and a screen therefor.

A back projection type image display apparatus which is of oblique projection type as shown in FIG. 1 has been known. An image light from a display device 1 such as a CRT is enlarged by a projection lens 2 and projected to a screen 5 from a back plane thereof obliquely at an incident angle $\theta_0$, through reflection mirrors 3 and 4. Those elements are housed in a cabinet 6.

The oblique projection type can reduce the length ( of the cabinet 6 compared to a normal projection type in which the light is projected normally to the screen 5 at an incident angle $\theta_0=0$, but the image light appears $\theta_0$ degrees below the horizontal angle and the incident angle expands in the periphery of the screen (particularly at the bottom in FIG. 1) and the image in that area is dark because of increased loss of light transmission. Thus, in order to emit the image light horizontally and deflect the image light gradually to reduce the light transmission loss, the use of the screen 5 which uses single or double eccentric center of prisms extending along a curve or arc deviates from a center of the screen) Fresnel lens sheet 5a or 5b as shown in FIGS. 2 and 3 has been proposed.

However, even in such screen 5, the following problems are encountered when the image light is reflected by mirrors 3 and 4 arranged as shown in FIG. 4.

If there is a plane or fresnel lens plane on a plane of the screen 5, a surface reflected light $\beta$ of the image light $\alpha$ from such plane may be directed to the mirror 4 and reflected thereby and directed back to the screen 5 at an incident angle $\theta_2$ (which is smaller than the incident angle $\theta_1$ of the image light $\alpha$). Such internal reflection phenomenon creates a ghost image or flare, which in turn reduces the contrast of the image displayed on the screen.

SUMMARY OF THE INVENTION

It is a primary object of the present invention to provide a back projection type image display apparatus for projecting an image light deflected by a mirror system to a screen, in which an effect of internal reflection by the mirror system is prevented to prevent the reduction of the contrast of a displayed image.

Other objects of the present invention will be apparent from the following description of the embodiments.

DESCRIPTION OF THE PREFERRED EMBODIMENTS

In order to achieve the above object, in accordance with the embodiments of the present invention, a plurality of cylindrical lenses each having a base line (i.e., generatrix) normal to a plane (primary light plane, i.e., principal ray plane) which contains a light emitted from a pupil center of a projecting optical system and directed to the center of a screen incident plane through a mirror system and having a vertically focusing function are arranged on the incident plane of the screen vertically, that is, along the primary light plane, and light transmitting areas and light blocking areas are alternately arranged on a light emitting plane vertically, that is, along the primary light plane.

In the present structure, even if the image light is reflected by the mirror and directed to the screen 5, the reincident light has a different incident angle component in the primary light plane than that of the inherent incident light at the same incident position, (in the present example, the incident angle component in the primary light plane is small). Accordingly, the light is substantially focused onto the light blocking areas by the lens and blocked thereby.

In other words, the lens, the light transmitting areas and the light blocking areas are arranged in such a positional relationship to attain the above function.

Figure 5:
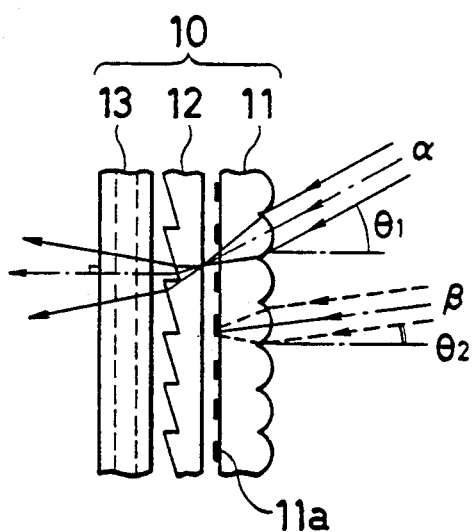
FIG. 5 shows a partial enlarged side view of one embodiment of a screen of the present invention.

FIG. 5 shows a partial enlarged side view of one embodiment of the screen of the present invention. The structure other than the screen is same as that shown in FIG. 1.

Figure 1:
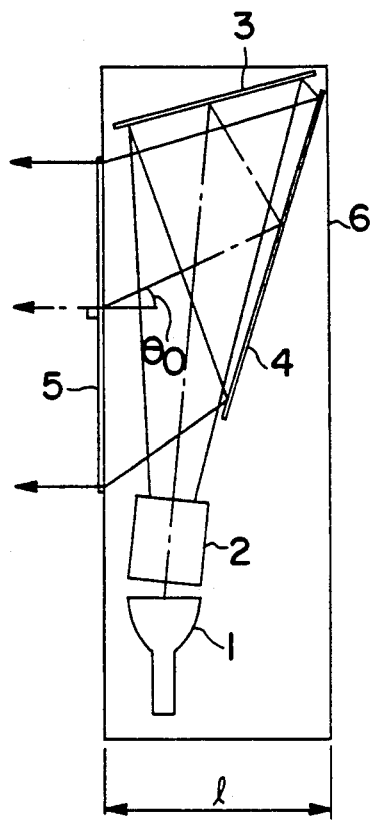
FIG. 1 shows a structure of a prior art apparatus.
Figure 2:
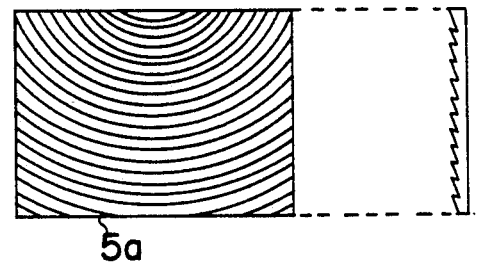
FIGS. 2 and 3 show prior art eccentric Fresnel lens sheets.
Figure 3:
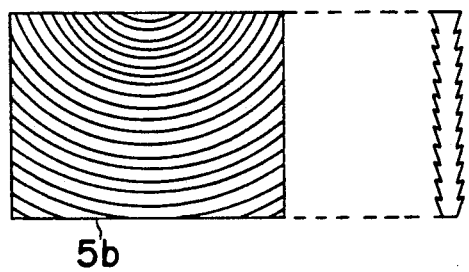
Figure 4:
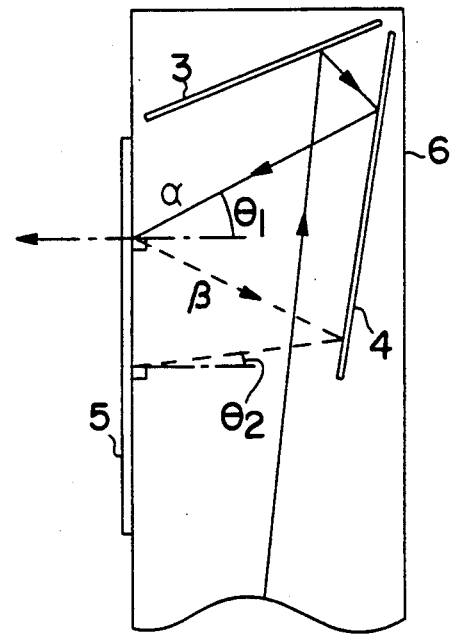
FIG. 4 illustrates problems encountered in the prior art apparatus.

The screen 10 has a lateral (laterally extending) lenticular sheet 11, an eccentric Fresnel lens sheet 12 and a vertical (vertically extending) double lenticular sheet 13, in this order as viewed from the light incident side. A plurality of lenticular lenses each having a base line extending laterally or horizontally (normal to the plane of the drawing) to provide a vertical focusing function are vertically arranged on the light incident plane of the lenticular sheet 11, and laterally extending black stripes 11a are arranged on the light emitting plane of the lenticular sheets 11 to face the lenticular lenses. The width of the black stripe 11a is narrower than the width of the lenticular lens, and the areas therebetween form the light transmitting areas. The eccentric Fresnel lens sheet 12 has a center of prisms above the screen 10 and has a function to deflect the obliquely applied image light substantially horizontally. As shown in FIG. 1, of the image light, the light emitted from the pupil center of the projecting lens and directed by the mirror system in the plane of the drawing.

The vertical double lenticular sheet 13 which is disposed on the light emitting side has a plurality of lenticular lenses having a vertically extending base line arranged on both sides thereof and has a function of reducing color shift by the expansion of horizontal angle of field and the in-line arrangement of a CRT (for example, a three tube type having R, G, B in-line).

In the present structure, the inherent image light $\alpha$ which is obliquely applied at the incident angle $\theta_1$ is focused by the lenses of the lenticular sheet 11 as shown in FIG. 1, passes through the gaps of the black stripes 11a, and is directed to the observation side through the Fresnel lens sheet 12 and the vertical lenticular sheet 13. On the other hand, the reflected light $\beta$ due to the internal reflection which causes the reduction of the contrast and which has the smaller incident angle $\theta_2$ to the screen 10 is focused by the lenses and directed to the black stripe 11a arranged on the front and absorbed thereby.

Where the CRT 1 has the in-line arrangement, that is, if the R, G and B CRT's are arranged in a lateral line with different projection angles such that the images are superimposed on the screen, the incident angles to the screen of the primary lights from the end CRT's are different from that of the center CRT by several degrees laterally, but the vertical components of the incident angles of the image light are substantially equal among the three CRT's, and the vertical differences between the image light and the reflected light are also equal. Accordingly, the above effect is attained in the three CRT's.

Accordingly, the reflected light β is not directed to the observer in front of the screen 10 and the image contrast is improved.

Further, since the vertical emitting light is expanded by the vertical focusing effect of the lateral lenticular sheet 11, the vertical view angle is expanded in accordance with the present embodiment.

Figure 6:
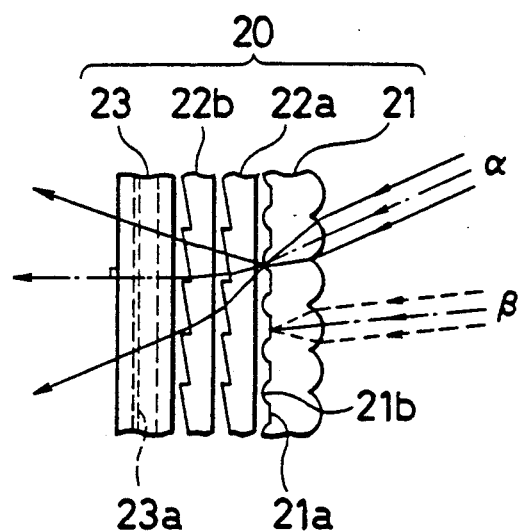
FIG. 6 shows a partial enlarged side view of another embodiment.

FIG. 6 shows a partial enlarged side view of another embodiment.

In the present embodiment, horizontally extending lenticular lenses 21b are arranged in the gaps of the black stripe 21a of the lateral lenticular sheet 21 which is arranged closest to the incident plane of the screen 20. Two eccentric Fresnel lens sheets 22a and 22b are arranged, and a black stripe 23a is arranged between the lenticular lenses on the exit plane of the vertical double lenticular sheet 23.

The operation is essentially the same as that of the embodiment of FIG. 5. The image light α is further expanded vertically by the lens effect of the additional lenticular lens 21b so that a wide vertical angle of field is attained. Since two eccentric Fresnel lens sheets 22a and 22b are arranged, the power of the obliquely applied light is distributed and the incident light is gradually deflected horizontally, as a result, the reflection loss on the Fresnel plane and the block (i.e. eclipse) of the light beam are more effectively prevented. Further, disturbance by an external light such as the reflection thereof is prevented by the additional black stripe 23a and the image quality is further improved.

In accordance with the present embodiment, the internal reflected light of the image light is effectively blocked and does not appear to the observer in front of the screen. Accordingly, the reduction of the image contrast is prevented and the vertical angle of view is improved.

What is claimed is:

1. An image display apparatus, comprising:
an image projector, having a reflecting mirror, for projecting a light beam with an image; and
a screen for receiving the image, said screen including a first sheet having a first surface facing said reflecting mirror for receiving the light beam reflected by said reflecting mirror and a second surface on a side opposite to said first surface, with a plurality of lens elements arranged on said first surface and light blocking elements arranged on said second surface so as to block a portion of the light beam which is reflected by said first surface back to said reflecting mirror and is re-reflected again to be incident on said second surface through said first surface, wherein said screen further includes a second sheet on which a Fresnel lens is formed, said second sheet disposed on an opposite side of said first sheet from said reflecting mirror.

2. An image display apparatus, comprising:
an image generator for generating an image;
a projection optical system for projecting the generated image with a light beam from said image generator, said projection optical system including a reflecting mirror for reflecting the light beam; and
a screen for receiving the image, said screen including a first sheet having a first surface facing said reflecting mirror for receiving the reflected light beam and a second surface on a side opposite to said first surface, with a plurality of lens elements arranged on said first surface and light blocking elements arranged on said second surface so as to block a portion of the light beam which is reflected by said first surface back to said reflecting mirror and is reflected again to be incident on said second surface through said first surface, wherein
said screen further includes a second sheet on which a Fresnel lens is formed, said second sheet disposed on an opposite side of said first sheet form said reflecting mirror.

3. An image display apparatus, comprising:
an image generator for generating an image;
a projection optical system for projecting the generated image with a light beam from said image generator, said projection optical system including a reflecting mirror for reflecting the light beam; and
a screen, having a perpendicular axis, for receiving said image, with the axis being inclined to the optical axis of said projection optical system, said screen having a first sheet positioned close to said reflecting mirror for receiving the reflected light beam and a second sheet on which a first Fresnel lens is formed, said first sheet having a first surface facing said reflecting mirror and a second surface facing said second sheet, with a first set of cylindrical lens elements being arranged on said first surface so that each generatrix thereof is perpendicular to a plane including said optical axis and said perpendicular axis, and light blocking elements extending in a direction parallel to the direction of said generatrices arranged on said second surface so as to block a portion of the light beam which is reflected by said first surface back to said reflecting mirror and is reflected again to be incident on said second surface through said first surface.

4. An apparatus according to claim 3, wherein said screen further comprises a third sheet which is positioned on an opposite side of said second sheet from said first sheet, and wherein a second set of cylindrical lens elements are arranged on said third element so that each generatrix of said second set of cylindrical lens elements is directed in a direction perpendicular to the generatrices of said first set of cylindrical lens elements on said first surface of said first sheet.

5. An apparatus according to claim 4, wherein said second set of cylindrical elements of said third sheet are arranged on first and second surfaces of said third sheet with said first surface facing said second sheet.

6. An apparatus according to claim 3, wherein said first Fresnel lens of said second sheet has an optical axis set so that the optical axis is deviated from the center of said second sheet, and wherein the light beam for forming the image is deflected in a horizontal direction.

7. An apparatus according to claim 6, wherein said second sheet has double sheets arranged along the optical axis of said Fresnel lens and said first Fresnel lens is formed on one of said double sheets and a second Fresnel lens is formed on the other of said double sheets.

8. An image display apparatus, comprising:
   an image projector, having a plurality of reflecting mirrors for projecting a light beam with an image; and
   a screen for receiving the image, said screen having a first sheet positioned close to said reflecting mirrors and a second sheet on which a first Fresnel lens is formed, said first sheet having a first surface facing said reflecting mirrors for receiving the light beam reflected by said reflecting mirrors and a second surface facing said second sheet, with a plurality of lens elements arranged on said second surface so as to block a portion of the light beam which is reflected by said first surface back to at least one of said plurality of mirrors and is re-reflected again to be incident on said second surface through said first surface.

* * * * *

UNITED STATES PATENT AND TRADEMARK OFFICE
CERTIFICATE OF CORRECTION

PATENT NO. : 5,191,472  Page 1 of 2
DATED : March 2, 1993
INVENTOR(S) : Katsumi Kurematsu, et al.

It is certified that error appears in the above-indentified patent and that said Letters Patent is hereby corrected as shown below:

ON THE TITLE PAGE,

[56] ASSIGNEE:

"Canon Kabushiki Kaisha, Japan" should read --Canon Kabushiki Kaisha, Tokyo, Japan--.

COLUMN 1:

Line 19, "length (" should read --length 1--.
Line 30, "center" should read --(center--.

COLUMN 2:

Line 63, "FIG. 1," should read --FIG. 5,--.

COLUMN 4:

Line 24, "form" should read --from--.
Line 55, "third element" should read --third sheet--.

UNITED STATES PATENT AND TRADEMARK OFFICE
CERTIFICATE OF CORRECTION

PATENT NO. : 5,191,472
DATED : March 2, 1993
INVENTOR(S) : Katsumi Kurematsu, et al.

Page 2 of 2

It is certified that error appears in the above-indentified patent and that said Letters Patent is hereby corrected as shown below:

COLUMN 6:

Line 5, "said second" should read --said first surface and light blocking elements arranged on said second--.

Signed and Sealed this

Second Day of November, 1993

Attest:

BRUCE LEHMAN

Attesting Officer

Commissioner of Patents and Trademarks